United States Patent Office 3,072,673
Patented Jan. 8, 1963

3,072,673
CHLORINATED 2-IMINOISOPYRROLES
Peter L. de Benneville, Philadelphia, and Heinz W. Blessing, Levittown, Pa., assignors to Rohm & Haas Company, Philadelphia, Pa., a corporation of Delaware
No Drawing. Filed Feb. 8, 1962, Ser. No. 171,823
3 Claims. (Cl. 260—313)

This invention deals with chlorinated 2-iminoisopyrroles as new compositions of matter. It further deals with a method for preparing these chlorinated 2-iminoisopyrroles.

The chlorinated 2-iminoisopyrroles of the present invention may be represented by the formula

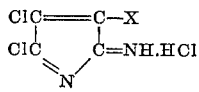

wherein X represents methyl or chlorine. These compounds are prepared by reacting succinonitrile or methyl-succinonitrile with chlorine in the presence of hydrogen chloride. The reaction is conducted by introducing a catalytic amount of hydrogen chloride into succinonitrile or methylsuccinonitrile, as the case may be, and then adding chlorine and hydrogen chloride in order to consummate the reaction. The reaction is carried out in the substantial absence of actinic light and under substantially anhydrous conditions.

Reaction temperatures range from the point at which succinonitrile or methylsuccinonitrile, as the case may be, is in the liquid state to up to about 120° C., preferably 50 to 90° C. While the reaction will occur at higher temperatures, generally outside of the stated temperature range there tends to be formed more and more of undesired chlorinated side products. The present reaction conducted in the presence of hydrogen chloride yields a product in the form of the corresponding hydrochloride. It is possible to convert the hydrogen chloride into other salts in non-aqueous systems by a metathesis procedure. Accordingly there may be formed the nitrate, phosphate, sulphate, acetate, and other salts. These are within the contemplation of the present invention. The free base is not as stable as the corresponding salt form, and therefore, it is preferred to keep the product in the form of the salt.

The present compounds are useful as herbicides, particularly in post-emergence applications. They are particularly effective when applied at ten pounds per acre according to standard techniques with a carrier. They are especially effective in substantially eradicating mustard, mallow, wild carrot, pigweed, and other undesirable plant life.

The present compounds as well as the method for their preparation may be more fully understood from the following examples which are offered by way of illustration and not by way of limitation. Parts by weight are used throughout.

Example 1

There is added to a flask, wrapped with a heavy cloth to exclude light, 55 parts of α-methylsuccinonitrile. A mixture of chlorine gas and hydrogen chloride is passed into the α-methylsuccinonitrile for 8½ hours. The temperature rises slowly to 83° C. during this period of addition and then drops back to 50° C. There is a gain in weight of 29.3 parts. A solid precipitates during the course of the reaction. The reaction mixture is filtered to remove liquid chlorination products. A solid (32.5 parts) is washed with acetone and then dried. The product is identified by analysis as 2,3-dichloro-4-methyl - 5 - iminoisopyrrole hydrochloride. It contains about 58% total chlorine, of which about 41% is identified as ionizable chlorine corresponding to the hydrochloride salt and chlorine in the 2-position.

In an attempt to determine a melting point for the solid product it is observed that there is no true melting point but only a gradual decomposition of the product with the elimination of acidic gases.

Example 2

There is added to a reaction flask, prepared for the exclusion of light, 80 parts of succinonitrile. The succinonitrile is heated to 70° C. and then hydrogen chloride is introduced over a period of 10 minutes. Chlorine is then introduced for a period of 20 hours during which time the reaction system is maintained at a temperature of 70 to 80° C. During the course of the reaction a solid precipitates from the reaction system. The solid product is filtered, washed with acetone and dried. A grayish white product is obtained in the amount of 24 parts. The product contains about 67% Cl and 12% nitrogen. Approximately one-half (34%) of the chlorine is ionizable, corresponding to the hydrochloride salt and chlorine in the 2-position. The product is identified as 2,3,4-trichloro-5-iminoisopyrrole hydrochloride, and has the structure

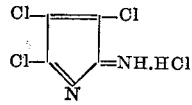

We claim:
1. The compound of the formula

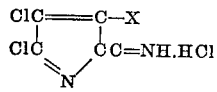

in which X is a member from the class consisting of chlorine and methyl.

2. 2,3-dichloro - 4 - methyl - 5 - iminoisopyrrole hydrochloride.

3. 2,3,4-trichloro-5-iminoisopyrrole hydrochloride.

References Cited in the file of this patent
UNITED STATES PATENTS
2,810,726    Howard _____ Oct. 22, 1957